(12) United States Patent
Jang et al.

(10) Patent No.: US 10,920,076 B2
(45) Date of Patent: Feb. 16, 2021

(54) SILICONE RUBBER COMPOSITE AND METHOD FOR PRODUCING SAME

(71) Applicant: LG CHEM, LTD., Seoul (KR)

(72) Inventors: Hyungsik Jang, Daejeon (KR); Pyeong Gi Kim, Daejeon (KR); Se Hyun Kim, Daejeon (KR); Dong Hyun Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 5 days.

(21) Appl. No.: 16/471,510

(22) PCT Filed: Jan. 9, 2018

(86) PCT No.: PCT/KR2018/000422
§ 371 (c)(1),
(2) Date: Jun. 19, 2019

(87) PCT Pub. No.: WO2018/135793
PCT Pub. Date: Jul. 26, 2018

(65) Prior Publication Data
US 2020/0017685 A1     Jan. 16, 2020

(30) Foreign Application Priority Data

Jan. 23, 2017 (KR) .......................... 10-2017-0010429
Jan. 23, 2017 (KR) .......................... 10-2017-0010431
(Continued)

(51) Int. Cl.
*C08L 83/04*     (2006.01)
*C08K 3/04*     (2006.01)
(Continued)

(52) U.S. Cl.
CPC .............. *C08L 83/04* (2013.01); *C08K 3/013* (2018.01); *C08K 3/041* (2017.05); *C08K 5/0025* (2013.01);
(Continued)

(58) Field of Classification Search
None
See application file for complete search history.

(56) References Cited

U.S. PATENT DOCUMENTS 8,592,512 B2    11/2013    Ziser et al.
2011/0224357 A1    9/2011    Ziser et al.
(Continued)

FOREIGN PATENT DOCUMENTS

EP     3584284 A1    12/2019
JP     2016-190982 A    11/2016
(Continued)

OTHER PUBLICATIONS

Kim et al. "Bioinspired, Highly Stretchable, and Conductive Dry Adhesives Baed on 1D-2D Hybrid Carbon Nanocomposites for All-in-One ECG Electrodes" ACS Nano, 2016, 10, 4770-4778. (Year: 2016).*
(Continued)

*Primary Examiner* — Robert S Loewe
(74) *Attorney, Agent, or Firm* — Dentons US LLP

(57) ABSTRACT

In the present invention, it is possible to provide a silicone rubber composite which exhibits a conductivity equal to or higher than that using a high content of carbon black, by using a low content of carbon nanotubes as a conductive filler instead of a high content of carbon black to impart conductivity to insulating silicone rubber.

14 Claims, 2 Drawing Sheets

(30) Foreign Application Priority Data

Jan. 23, 2017 (KR) .................. 10-2017-0010432
Dec. 21, 2017 (KR) .................. 10-2017-0177247

(51) Int. Cl.
*C08K 3/013* (2018.01)
*C08K 5/00* (2006.01)
*C08K 5/14* (2006.01)

(52) U.S. Cl.
CPC .......... *C08K 5/14* (2013.01); *C08K 2201/001* (2013.01); *C08K 2201/016* (2013.01)

(56) References Cited

U.S. PATENT DOCUMENTS

2018/0044498 A1 2/2018 Shigeta et al.
2018/0240567 A1 8/2018 Kang et al.

FOREIGN PATENT DOCUMENTS

| KR | 10-2011-0053312 A | 5/2011 |
|---|---|---|
| KR | 10-1101172 B1 | 12/2011 |
| KR | 10-1412623 B1 | 7/2014 |
| KR | 10-2015-0033867 A | 4/2015 |
| KR | 10-2017-0087226 A | 7/2017 |
| WO | 2016/136275 A1 | 9/2016 |

OTHER PUBLICATIONS

Theilmann et al. "Superior electronmagnetic interference shielding and dielectric properties of carbon nanotube composites through the use of high aspect ratio CNTs and three-roll milling" Organic Electronics 2013, 14, 1531-1537. (Year: 2013).*
Kumar et al. "Synergistic effects of hybrid carbon nanomaterials in room-temperature-vulcanized silicone rubber" Polym Int, 66, 2017, 450-458. (Year: 2017).*
Huang et al. "Synergistic effects and piezoresistive characteristics of carbon nanofillers/silicone rubber composites" Materials Technology: Advanced Performance Materials 2016, 31, 228-233. (Year: 2016).*
Technical data sheet for TNM5, 5 pages, 2020. (Year: 2020).*
Technical data sheet for GD-401, which is in Chinese, 3 pages, 2020. (Year: 2020).*
Technical data sheet for Dow Corning Syldard 184 Elastomer, 4 pages, 2020. (Year: 2020).*
Technical data sheet for GD-401, which is in English, 3 pages, 2020. (Year: 2020).*

* cited by examiner

SILICONE RUBBER COMPOSITE AND METHOD FOR PRODUCING SAME

CROSS-REFERENCE TO RELATED APPLICATIONS

This application is the national stage of international Application No. PCT/KR2018/000422 filed on Jan. 9, 2018, which claims the benefit of priority to Korean Patent Application Nos. 10-2017-0010429, 10-2017-0010431 and 10-2017-0010432 filed on Jan. 23, 2017, and 10-2017-0177247 filed on Dec. 21, 2017, the entire disclosures of which are incorporated herein by reference.

BACKGROUND OF THE INVENTION

Field of Invention

The present invention relates to a silicone rubber composite having uniform surface resistivity and volume resistivity and a method for producing same.

Description of the Related Art

Silicone refers to a polymer in which oxygen atoms and silicon (Si) atoms having organic groups are linked to each other. That is, it is a polymer in which organic group-bonded silicon atoms are linked via a siloxane linkage (Si—O—Si). Silicone is not a natural material and is completely artificially synthesized.

Silicone rubber is produced by adding various fillers such as silica to a siloxane polymer formed from silicon as a raw material.

Silicone rubbers are classified into an HTV (high temperature vulcanizing) silicone rubber which is cured by heating to a great extent and an RTV (room temperature vulcanizing) silicone rubber which is cured at room temperature, depending on a curing temperature. However, in recent years, with commercialization of the liquid silicone rubber formed by addition reactions, it is not sufficient to classify silicone rubbers depending only on the conventional curing temperature. As a result, silicone rubbers are re-classified according to the degree of polymerization or viscosity of the polymer, and thereby silicone rubbers are roughly divided into a solid silicone rubber (HCR), a liquid silicone rubber (LSR) and a room-temperature vulcanizing silicone rubber (RTV).

Silicone rubbers are characterized by its heat resistance, cold resistance, weather resistance, conductivity, steam resistance, oil resistance, flame retardant, radiation resistance and non-toxicity, according to its production method and fillers to be added. It is widely used in defense and aerospace industries, automobiles and their application fields where high reliability and stability are required. Silicone rubbers are also widely used in advanced electric and electronic industries due to its excellent electrical properties. Silicone rubbers with excellent elasticity have outstanding excellent characteristics such that it is not necessary to consider the elasticity when designing elastic parts.

Silicone rubber has no chemical similarity with normal organic rubber, but it is similar to organic rubber in that silicone rubber and normal organic rubber have expansion and contraction property, elasticity, repulsion and flexibility in terms of their physical properties. However, once physical or chemical external forces are applied thereto, they show different properties. Although normal rubber has superior physical properties at room temperature than silicone rubber, its properties such as tensile strength, elongation and abrasion resistivity are easily deteriorated by high or low temperature environment or chemicals. However, silicone rubber does not undergo a significant change in original properties for a much wider range of temperature and chemicals.

Silicone rubber has a unique chemical structure having a low proportion of carbon in the molecule. It exhibits excellent resistivity to arc and corona discharge under high voltage and therefore it is widely used as a general insulating material. Even if it is burned, there remains silica which is an insulating material, and thus it can be used as an insulator under strict condition. Also, it is possible to manufacture a conductive silicone rubber by adding a conductive filler such as special carbon black.

SUMMARY OF THE INVENTION

A problem to be solved by the present invention is to provide a silicone rubber composite composition for a silicone rubber composite having uniform surface resistivity and volume resistivity.

Other problem to be solved by the present invention is to provide a conductive silicone rubber composite composition having improved mechanical properties.

Another problem to be solved by the present invention is to provide a silicone rubber composite produced from the silicone rubber composite composition.

The present invention also provides a method for producing the silicone rubber composite.

In order to solve the problems of the present invention, there is provided a silicone rubber composite composition comprising solid silicone rubber and carbon nanotubes having a length/diameter (L/D) value of 500 or more.

According to one aspect, the length/diameter (L/D) value of the carbon nanotubes may be 5000 or less.

According to one aspect, the carbon nanotubes are compressed or uncompressed and may have a bulk density of 25 $kg/m^3$ or more before being blended with solid silicone rubber.

According to one aspect, the composition may comprise 0.2 to 10 parts by weight of carbon nanotubes relative to 100 parts by weight of the silicone rubber.

According to one aspect, the composition may further comprise 5 to 15 parts by weight of carbon black relative to 100 parts by weight of the silicone rubber.

According to one aspect, the carbon nanotube and the carbon black are contained in a weight ratio of 1:5 to 1:20, and the total content of the carbon nanotube and the carbon black may be 10 parts by weight or more and 15 parts by weight or less relative to 100 parts by weight of the solid silicone rubber.

According to one aspect, the solid silicone rubber may be in a solid or semi-solid state having no fluidity, such as jelly or pudding.

The present invention also provides a silicone rubber composite produced from the above-described silicone rubber composite composition.

According to one aspect, a specific gravity of the silicone rubber composite may be 1.18 or less.

According to another aspect, the silicone rubber composite may have a hardness of 60 or more.

According to another aspect, the silicone rubber composite may have a surface resistivity of $10^7$ Ω/sq. or less.

According to another aspect, the silicone rubber composite may have a volume resistivity of 20 Ω·cm or less.

According to another aspect, the silicone rubber composite may have an elongation of 300% or more.

The present invention also provides a method for producing a silicone rubber composite, comprising the steps of:
   adding carbon nanotubes, or carbon nanotubes and carbon black to solid silicone rubber to prepare a mixture;
   kneading the mixture;
   blending a curing agent into the kneaded mixture; and
   curing and compression molding the blend with the curing agent,
   wherein the carbon nanotubes have a length/diameter (L/D) value of 500 or more.

Effect of the Invention

In the present invention, by using a carbon nanotube having a specific length/diameter (L/D) value as a conductive filler instead of carbon black which should be added in a high content in order to impart conductivity to insulating silicone rubber, it is possible to provide a silicone rubber composite which not only exhibits a high electrical conductivity even in a small content, but also has improved mechanical properties such as elongation and hardness of the silicone rubber composite.

In addition, by adding a carbon nanotube having a specific length/diameter (L/D) value and carbon black together as a conductive filler, it is possible to provide a silicone rubber composite which exhibits a lower surface resistivity and a lower volume resistivity than when carbon black is used alone as a conductive filler, allowing to provide a significantly improved conductivity of the composite, and exhibits very uniform conductivity as a whole due to a small variation by position of the surface resistivity and the volume resistivity of the composite.

DETAILED DESCRIPTION OF THE INVENTION

Figure 1A:
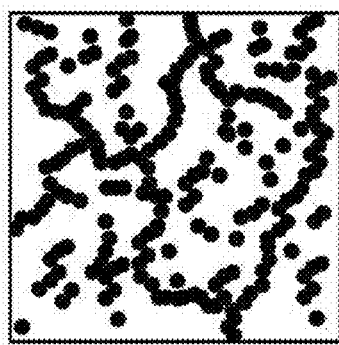
FIG. 1A schematically shows a distribution of carbon black in a composite.

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description, well-known functions or constructions are not described in detail if it is determined that they may obscure the gist of the present invention.

A carbon-based conductive material such as carbon black is used as a filler to impart conductivity to silicone rubber having an insulating property. In order to obtain sufficient conductivity using such carbon black, 10 wt % or more of carbon black should be mixed. However, as a large amount of carbon black is added, there is a problem that deterioration of dispersibility in the production process and sloughing of the molded article are occurred. In addition, in spite of such a high contents, surface resistivity reaches $10^6$ to $10^7$ $\Omega$/sq., so that it is difficult to obtain a sufficient electric conductivity.

Accordingly, the present invention provides a silicone rubber composite composition that uses a carbon nanotube having a specific L/D value as a conductive filler, thereby providing a silicone rubber composite which exhibits superior conductivity even with a significantly lower content than in the case of using carbon black.

Specifically, the present invention provides a silicone rubber composite composition comprising solid silicone rubber and carbon nanotubes having a length/diameter (L/D) value of 500 or more.

For the solid silicone rubber, the solid phase means a solid or semi-solid state having no fluidity such as jelly or pudding. For example, the solid silicone rubber may be HCR (High Consistency Rubber) silicone, or may be made in a solid state by adding silica and other additives such as a catalyst to a liquid siloxane polymer.

According to one embodiment, the length/diameter (L/D) value of the carbon nanotubes may be 500 or more, or 600 or more, or 700 or more, or 800 or more, or 900 or more, or 1000 or more and 5000 or less, or 4000 or less, or 3000 or less, or 2000 or less. The higher the L/D value is, the more the contact points of the carbon nanotubes. From this, a larger L/D value is more preferable to obtain a high electrical conductivity at a lower content of carbon nanotubes. However, when the L/D value is too large, the bulk density becomes large and the processability may be deteriorated.

The carbon nanotubes are compressed in the form of pellets or uncompressed and may have a bulk density of 25 kg/m3 or higher before being blended with the solid silicone rubber. Compressed carbon nanotubes may be desirable for processability, but even in this case, the bulk density of 300 kg/m3 or less is preferable in terms of processability. The bulk density after compression may preferably be 50 to 200 kg/m3 or 80 to 180 kg/m3 or 100 to 160 kg/m3.

A method for manufacturing compressed CNTs can be found in Korean Patent Application No. 10-2016-0006935 of the present applicant, which is incorporated herein in its entirety.

According to one embodiment, the carbon nanotube may be contained in an amount of 0.2 to 10 parts by weight, preferably 0.5 to 5 parts by weight, or 0.5 to 3 parts by weight or 0.5 to 2 parts by weight, relative to 100 parts by weight of the solid silicone rubber.

By using the carbon nanotube as a conductive filler, the present invention can exhibit a high conductivity even in a much smaller amount than in the case of using carbon black as a conductive filler. For example, a composite containing a carbon nanotube as a conductive filler has the content of carbon nanotube equal to or of only 1/10 to 1/20 of the content of carbon black, in order to exhibit a conductivity equal to or higher than that of a composite containing carbon black as a conductive filler. For example, the composite according to the present invention may have a surface resistivity of $10^7$ $\Omega$/sq. or less, or $10^3$ $\Omega$/sq. or less, preferably $10^2$ $\Omega$/sq. or less when the carbon nanotubes are contained in an amount of 0.2 to 1.5 parts by weight based on 100 parts by weight of the solid silicone rubber.

The composite according to the present invention may have a volume resistivity of 20 $\Omega$·cm or less, preferably 10 $\Omega$·cm or less.

The composite composition according to the present invention allows to reduce sloughing phenomenon of the composite (the degree to which is stained with a composite when rubbing the composite on a paper). It indicates that the carbon nanotubes are firmly bonded to the silicon rubber composite and that the carbon nanotubes are not contained in an excessive amount in the composite so as not to affect the physical properties of the composite. The sloughing phenomenon is a phenomenon in which the conductive fillers are detached due to friction with other accessories. It may cause defects of the product and may cause problems when applied to products because of staining in black. The composition according to the present invention can prevent this problem.

The silicone rubber composite according to the present invention may have a hardness equal to that in the case of containing a large amount of carbon black, although it has a smaller content of carbon nanotube than that of carbon black. For example, the hardness of the silicone rubber composite according to the present invention may be 60 or more, preferably 60 to 80, as measured according to ASTM D2240 standard.

According to one embodiment, the silicon rubber composite according to the present invention uses a carbon nanotube that is lighter than carbon black and is contained in a smaller amount than in case of containing carbon black. Therefore, the specific gravity of the silicone rubber composite may not be increased significantly compared with that of silicon rubber which does not contain a conductive filler, thereby reducing the weight of the composite.

According to one embodiment, the specific gravity of the silicone rubber composite according to the present invention may be 1.17 or more and 1.18 or less, and preferably from 1.17 to 1.178.

In addition, the silicone rubber composite according to the present invention can be improved in elongation by adding a small amount of carbon nanotubes, as compared with the case of using carbon black. It may preferably exhibits an elongation of 300% or more, more preferably 350% or more. It is most preferred that the silicone rubber composite has an improved hardness and conductivity compared to the silicone rubber while retaining other characteristics of the silicone rubber, for example, properties such as elongation which is a characteristic required for rubber. However, in the case of carbon black to be added as a conventional conductive filler, a large amount of carbon black should be contained in order to improve the conductivity. From this, there are disadvantages that a hardness of the composite may increase rapidly, and as the hardness increases, an elongation decreases rapidly. In the present invention, the conductivity can be remarkably improved by merely adding a small amount of the carbon nanotube, and therefore, the hardness is not greatly increased, so that it is possible to exhibit an elongation close to that of the silicone rubber.

The silicone rubber composite according to the present invention can be produced by a method comprising the steps of:
 mixing solid silicone rubber and carbon nanotubes;
 kneading the mixture of the solid silicone rubber and the carbon nanotubes;
 blending a curing agent into the kneaded mixture; and
 curing and compression molding the blend with the curing agent.

In the present invention, by using carbon nanotubes having a specific L/D value, it is possible to apply a mixing method using solid silicone rubber which was not available due to problems of dispersing and mixing and also it is possible to obtain a conductivity equal to or higher than that in the case of using a high content of carbon black, even with a low content of carbon nanotube.

According to one embodiment, the solid silicone rubber may be a commercially available HCR silicone rubber. Alternatively, it may be solid silicone rubber which is produced by a method comprising the step of preparing a liquid siloxane polymer; and adding additives such as silica and catalyst to the liquid siloxane polymer.

According to one embodiment, the catalyst may be platinum (Pt) or a platinum-based compound, and the platinum-based compound may be selected from chloroplatinic acid or a chloroplatinic acid compound containing an alcohol, ether, aldehyde and vinylsilane group and a phosphoric acid-based platinum compound (Pt{P(CH3)3}4, Pt{P(C4H9)3}4, Pt{P(OCH3)3}4, Pt{P(OC6H5)3}3, Pt{P(C6H5)3}3, Pt{P(OC6H5)3}4, Pt{P(C6H5)3}4, Pt{P(C6H5) (C2H5)2}4, Pt{P(OC6H5) (OC2H5)2}4, Pt{P(C6H5)2(OC2H5)}4, Pt{P(CH3)2 (OC4H9)}4).

In the curing step of the mixture, a curing agent is added, and the curing agent for curing the silicone rubber composite composition is included for the purpose of forming a cross-linking of the silicone rubber.

The curing agent may comprise organic peroxides. The organic peroxides may comprise at least one of alkyl-based organic peroxides and acyl-based organic peroxides which can generate radicals by pyrolysis at 75° C. to 220° C.

Examples of the alkyl-based curing agent may include 3,3,5,7,7-pentamethyl-1,2,4-trioxepane, dicumyl peroxide, di-tert-butyl peroxide, 2,5-dimethyl-2,5-di-tert-butylperoxy hexane, di-tert-butyl cumyl peroxide, di-tert-butylperoxy isopropyl benzene, butyl 4,4-di-tert-butylperoxy valerate, di-tert-butylperoxy 2-ethylhexyl carbonate, and the like. As specific examples, the acyl-based curing agent may include a peroxide-based curing agent such as di-2,4-dichlorobenzoyl peroxide, benzoyl peroxide, and para-chlorobenzoyl peroxide.

The organic peroxide curing agent may be contained in an amount of 0.1 to 5 parts by weight based on 100 parts by weight of the solid silicone rubber. In the above range, it facilitates crosslinking and curing, and excellent mechanical properties and heat resistance can be obtained. For example, it can be contained in an amount of 0.5 to 5 parts by weight. Alternatively, it can be contained in an amount of 0.5 to 3 parts by weight.

In the present invention, by using a carbon nanotube as a filler instead of carbon black which should be added in a high content in order to impart conductivity to insulating silicone rubber, it is possible to provide a silicone rubber composite which exhibits an electrical conductivity equal to or higher than that in the case of using a high content of carbon black, even with a low content of carbon nanotube, thereby significantly reducing sloughing phenomenon. Such a silicone rubber composite is suitable for application to electric and electronic trays, sheets, keypads, game machines, covers for cellular phones, and various electric and electronic parts.

The silicone rubber composite according to the present invention may further contain other additive as long as it does not affect physical properties and characteristics of the composite.

According to another aspect of the present invention, there is provided a silicone rubber composite composition comprising solid silicone rubber and a carbon-based additive, wherein the carbon-based additive includes a carbon nanotube and carbon black in a weight ratio of 1:5 to 1:20 and the total content of the carbon-based additive is 10 parts by weight or more and 15 parts by weight or less based on 100 parts by weight of the solid silicone rubber.

Figure 1B:
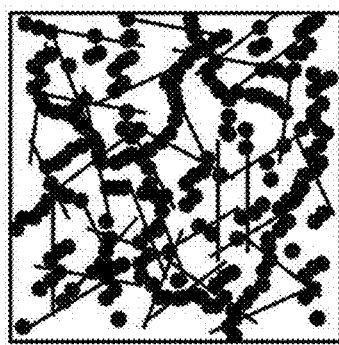
FIG. 1B schematically shows a distribution of a mixture of carbon black and 1% CNT in a composite.
Figure 1C:
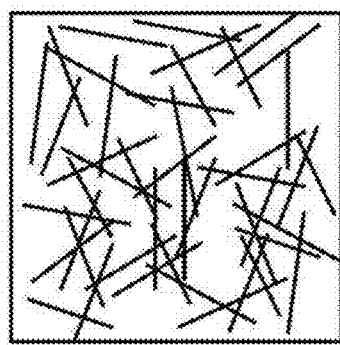
FIG. 1C schematically shows a distribution of CNT in a composite.
Figure 2:
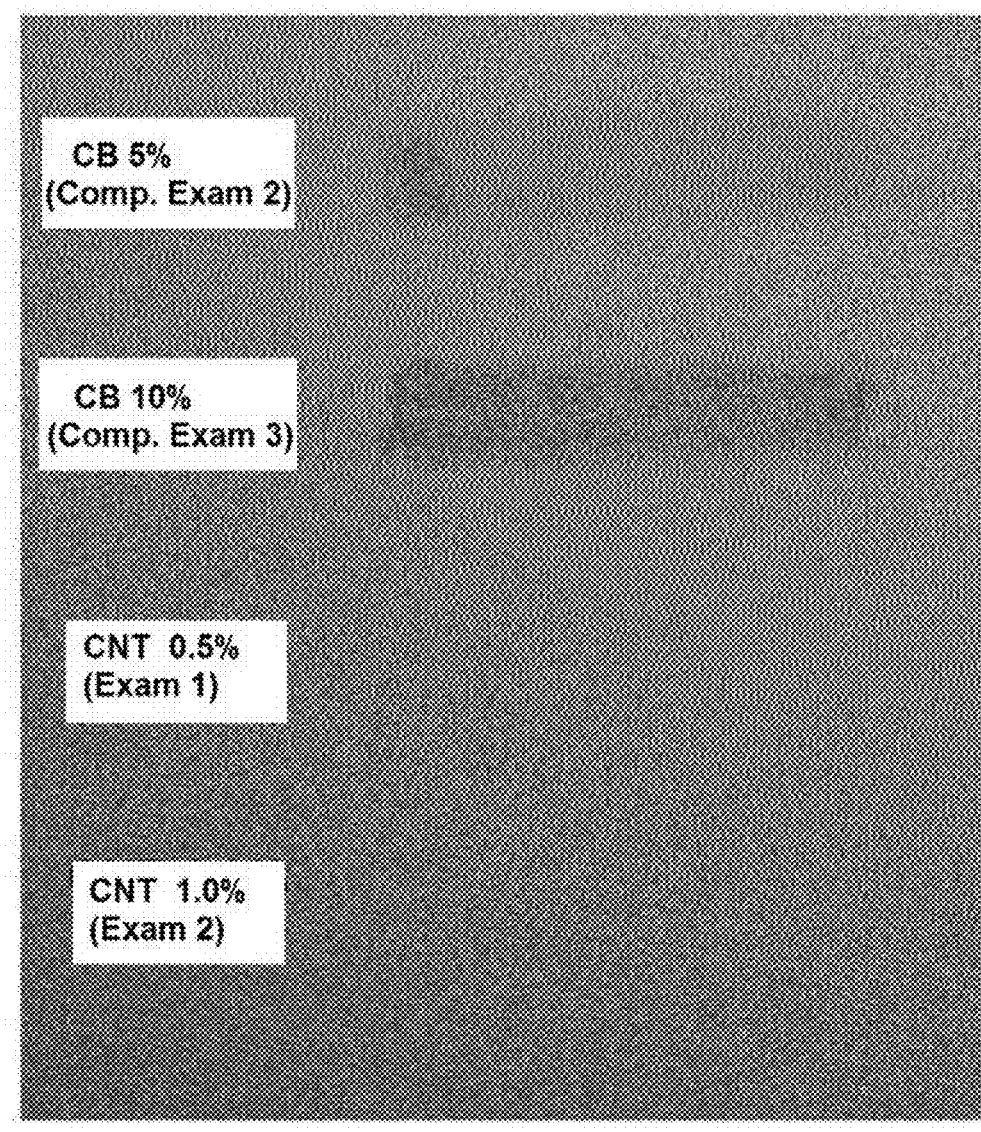
FIG. 2 shows slipping characteristics of the silicone rubber composite according to Examples and Comparative Examples.

By adding the carbon nanotube and the carbon black together, it is possible to obtain both effects due to the carbon black and the carbon nanotube. For example, as shown in FIGS. 1A to 1C, in the case of spherical carbon black, conductivity can be imparted only if the carbon blacks are adjacent to each other. On the other hand, in the case of carbon nanotube which is a linear particle, conductivity can be imparted just if the carbon nanotubes have points of contact with each other. Since the linear carbon nanotube is mixed with the spherical carbon black to connect the broken portions between the carbon black, not only the variation by position of the resistivity of the composite can be greatly reduced, but also the surface resistivity and the volume resistivity are significantly reduced, and thus the conductivity can be further improved.

The carbon nanotube and the carbon black may be added in a weight ratio of 1:5 to 1:20, and more preferably 1:10 to 1:20.

The total content of the carbon nanotube and the carbon black is preferably 10 parts by weight or more and 15 parts by weight or less based on 100 parts by weight of the solid silicone rubber. More preferably, the carbon nanotube may be included in an amount of 0.2 to 5 parts by weight, preferably 0.2 to 3 parts by weight, based on 100 parts by weight of the solid silicone rubber, and the carbon black may be contained in an amount of 5 to 15 parts by weight, preferably 5 to 10 parts by weight based on 100 parts by weight of the solid silicone rubber.

According to one aspect, by using the carbon nanotube and the carbon black together, the conductivity can be further improved, and a composite having more uniform conductivity can be provided.

According to one embodiment, the surface resistivity of the silicone rubber composite is $10^2$ Ω/sq. or less, preferably 50 Ω/sq. or less, and the variation of the surface resistivity in the composite may be 3 or less.

According to one embodiment, the volume resistivity of the silicone rubber composite is 20 Ω·cm or less, preferably 10 Ω·cm or less, and the variation of the volume resistivity in the composite may be 1 or less.

In the present invention, by using carbon nanotubes as a filler instead of carbon black which should be added in a high content in order to impart conductivity to insulating silicone rubber, it is possible not only to reduce the sloughing phenomenon of the composite (the degree to which is stained with a composite when rubbing the composite on a paper), but also to provide a silicone rubber composite having a high electrical conductivity even with a small content of the carbon nanotube. Such a silicone rubber composite is suitable for application to electric and electronic trays, sheets, keypads, game machines, covers for cellular phones, and various electric and electronic parts.

Hereinafter, embodiments of the present invention will be described in detail so that those skilled in the art can easily carry out the present invention. The present invention may, however, be embodied in many different forms and should not be construed as limited to the embodiments set forth herein.

The measurements of physical properties used in the examples are as follows.

Specific gravity: A specific gravity value was calculated by measuring mass of product and its volume when immersed in water according to ASTM D 792.

Hardness: Shore A hardness was measured on molded sheet of silicone rubber composite according to ASTM D 2240.

Surface resistivity and volume resistivity:

Using Mitsubishi Loresta (4-probe type) equipment, surface resistivity and volume resistivity for front and back sides of molded sheet of silicone rubber composite were measured 10 times.

Elongation:

An elongation was measured by the standard method of ASTM D412 Type.

Processability

○: It is possible to put fillers at one time during kneading process and kneading is performed without problems.

Δ: There is some difficulty of feeding fillers during kneading process due to a low bulk density of CNT, but there is no problem in kneading itself after feeding.

X: Since a bulk density of CNT is too low, fillers should be put in portions or fillers can be put and kneaded only after the fillers are compression molded to reduce the volume.

Bulk density: A 100-cc container was prepared and the carbon nanotubes were freely dropped into the container. Then, excess carbon nanotubes were scraped from the top of the container with a spatular or the like to measure a density of the sample contained in the container, taking care not to tapping.

Example 1 (0.5 wt % of Carbon Nanotube)

2500 g of HCR silicone rubber which is solid silicone rubber and 12.5 g of carbon nanotubes having an L/D value of 1000 or more were put into a kneader apparatus and mixed and kneaded at a temperature of 50° C. for 10 minutes to prepare a paste of CNT/silicone rubber mixture.

The paste of CNT/silicone rubber mixture was dispersed in a two-roll mill with adding a peroxide curing agent. Thereafter, compression molding was carried out in a molding mold with a load of 2,000 Kgf at a temperature of 170° C. for 5 minutes to produce a silicone rubber composite sheet.

Example 2 (1 wt % of Carbon Nanotube)

2500 g of HCR silicone rubber which is solid silicone rubber and 25 g of carbon nanotubes having an L/D value of 1000 or more were put into a kneader apparatus and mixed and kneaded at a temperature of 50° C. for 10 minutes to prepare a paste of CNT/silicone rubber mixture.

The paste of CNT/silicone rubber mixture was dispersed in a two-roll mill with adding a peroxide curing agent. Thereafter, compression molding was carried out in a molding mold with a load of 2,000 Kgf at a temperature of 170° C. for 5 minutes to produce a silicone rubber composite sheet.

Example 3 (1 wt % of Carbon Nanotube)

A silicone rubber composite sheet was produced in the same manner as in Example 2 except that carbon nanotubes having an L/D value of 500 were used.

Example 4 (1 wt % of Carbon Nanotube)

A silicone rubber composite sheet was produced in the same manner as in Example 2 except that carbon nanotubes having an L/D value of 5000 were used.

Comparative Example 1

2500 g of HCR silicone rubber which is solid silicone rubber was dispersed in a two-roll mill with adding a peroxide curing agent. Thereafter, compression molding was carried out in a molding mold with a load of 2,000 Kgf at a temperature of 170° C. for 5 minutes to produce a silicone rubber composite sheet.

Comparative Example 2 (5 wt % of Carbon Black)

2500 g of HCR silicone rubber which is solid silicone rubber and 125 g of Denka Acetylene Black were put into a kneader apparatus and mixed and kneaded at a temperature of 50° C. for 10 minutes to prepare a paste of carbon black (CB)/silicone rubber mixture.

The paste of carbon black(CB)/silicone rubber mixture was dispersed in a two-roll mill with adding a peroxide curing agent. Thereafter, compression molding was carried out in a molding mold with a load of 2,000 Kgf at a temperature of 170° C. for 5 minutes to produce a silicone rubber composite sheet.

Comparative Example 3 (10 wt % of Carbon Black)

A silicone rubber composite sheet was produced in the same manner as in Comparative Example 2 except that 250 g of Denka Acetylene Black were added instead of 125 g.

Comparative Example 4 (L/D Value of 200)

A silicone rubber composite sheet was produced in the same manner as in Example 2 except that carbon nanotubes having an L/D value of 200 were used.

Comparative Example 5 (L/D Value of 400)

A silicone rubber composite sheet was produced in the same manner as in Example 2 except that carbon nanotubes having an L/D value of 400 were used.

Comparative Example 6 (L/D Value of 6000)

A silicone rubber composite sheet was produced in the same manner as in Example 2 except that carbon nanotubes having an L/D value of 6000 were used.

Comparative Example 7 (L/D Value of 22000)

A silicone rubber composite sheet was produced in the same manner as in Example 2 except that carbon nanotubes having an L/D value of 22000 were used.

<Experimental Example 1> Measurement of Physical Properties of Silicone Rubber Composite The specific gravity, hardness, surface resistivity, processability, and bulk density (BD) of the silicone rubber composites prepared in the above Examples and Comparative Examples were measured and shown in Table 1 below.

TABLE 1

|  | Filler | CNT L/D ratio | Specific gravity (relative value) | Hardness (Shore A) | Surface resistivity ($10^{\hat{}}$) (Ω/sq.) | Process-ability | CNT BD (uncompressed) (kg/m3) |
|---|---|---|---|---|---|---|---|
| Comp. Example 1 | — (Reference) | — | 1.170 | 57 | >13* (Out of measurement range) | — | — |
| Comp. Example 2 | CB 5 wt % | — | 1.191 | 65 | >13* (Out of measurement range) | ○ | — |
| Comp. Example 3 | CB 10 wt % | — | 1.210 | 72 | 6~7 | ○ | — |
| Example 1 | CNT 0.5 wt % | 1000 | 1.172 | 62 | 6~7 | ○ | 25 |
| Example 2 | CNT 1 wt % | 1000 | 1.175 | 64 | 3~4 | ○ | 25 |
| Example 3 | CNT 1 wt % | 500 | 1.174 | 63 | 4~5 | ○ | 26 |
| Example 4 | CNT 1 wt % | 5000 | 1.175 | 64 | 3~4 | Δ | 25 |
| Comp. Example 4 | CNT 1 wt % | 200 | 1.173 | 63 | 11~12 | ○ | 28 |
| Comp. Example 5 | CNT 1 wt % | 400 | 1.173 | 63 | 7~9 | ○ | 26 |
| Comp. Example 6 | CNT 1 wt % | 6000 | 1.174 | 63 | 4~5 | X | 21 |
| Comp. Example 7 | CNT 1 wt % | 22000 | 1.174 | 62 | 4~5 | X | 13 |

From the results of Comparative Examples 1 to 3 and Examples 1 to 4, it can be seen that the silicone rubber composite according to the present invention has a specific gravity similar to that of the silicone rubber which does not contain carbon nanotubes, whereas a specific gravity of the silicone rubber composite which contains carbon black as a filler is increased by 1.7% or more.

In addition, the silicone rubber composite according to the present invention has a significantly reduced surface resistivity in spite of containing carbon nanotubes in an amount of 1/10 or less as compared with the amount of carbon black, and has a hardness equal to that of silicone rubber containing a large amount of carbon black filler. Accordingly, it can be seen that the silicone rubber composite containing carbon nanotubes according to the present invention can provide a silicone rubber composite having low weight, high hardness and high conductivity.

From the results of Comparative Examples 4 to 7, it can be seen that when the L/D value is less than 500, the surface resistivity value becomes larger and when the L/D value exceeds 5000, the processability becomes worse.

<Experimental Example 1> Measurement of Sloughing

The results of determining occurrence of sloughing of the silicone rubber composites prepared in Examples 1 and 2 and Comparative Examples 2 and 3 are shown in FIGS. 1A to 1C. The product was rubbed on a blank paper about 10 times to compare the degree of staining. As shown in FIGS. 1A to 1C, it can be seen that the silicone rubber composite according to the present invention does not cause any sloughing.

Increase of Carbon Nanotube Content

Example 5 (2 wt % of Carbon Nanotube)

A silicone rubber composite sheet was produced in the same manner as in Example 1 except that 50 g of carbon nanotubes having an L/D value of 1000 or more were used.

Example 6 (3 wt % of Carbon Nanotube)

A silicone rubber composite sheet was produced in the same manner as in Example 1 except that 75 g of carbon nanotubes having an L/D value of 1000 or more were used.

Comparative Example 8 (15 wt % of Carbon Black)

A silicone rubber composite sheet was produced in the same manner as in Comparative Example 2 except that 375 g of Denka Acetylene Black was used.

The results of measurement of specific gravity, hardness, elongation, surface resistivity and volume resistivity of the composites of Comparative Examples 1, 3 and 8 and Examples 5 and 6 are shown in Table 2.

TABLE 2

| | Filler | L/D ratio | Specific gravity (relative value) | Hardness (Shore A) | Elongation (%) | Surface resistivity ($10^\circ$) (Ω/sq.) | Volume resistivity (Ω · cm) |
|---|---|---|---|---|---|---|---|
| Comp. Example 1 | — (Reference) | — | 1.170 | 57 | >500 | >13 | (Out of measurement range) |
| Comp. Example 3 | CB 10 wt % | — | 1.210 | 72 | 300 | 6~7 | 5~6 |
| Comp. Example 8 | CB 15 wt % | — | — | — | — | Unmixable | — |
| Example 5 | CNT 2 wt % | 1000 | 1.179 | 68 | 415 | 2 | 1 |
| Example 6 | CNT 3 wt % | 1000 | 1.183 | 71 | 360 | 1 | 1 |

As shown in Table 2, the silicone rubber composite according to the present invention has a hardness similar to that in the case of containing a large amount of carbon black, but exhibits a smaller decrease in an elongation than that in the case of using carbon black, based on the elongation of the silicone rubber itself (Comparative Example 1). This suggests that the present invention is advantageous in maintaining physical properties of the silicone rubber itself by containing a much smaller amount of carbon nanotube than in the case of adding carbon black. That is, the surface resistivity and the volume resistivity of the silicone rubber composite can be remarkably reduced and the mechanical properties can be further improved, just by adding carbon nanotube in a much smaller amount than in the case of using carbon black (Comparative Examples 2 and 3).

Combination Use of Carbon Nanotube and Carbon Black

Example 7 (1 wt % of Carbon Nanotube+10 wt % of Carbon Black)

2500 g of HCR silicone rubber which is solid silicone rubber, 25 g of carbon nanotubes having an L/D value of 1000 or more and 250 g of Denka Acetylene Black were put into a kneader apparatus and mixed and kneaded at a temperature of 50° C. for 10 minutes to prepare a paste of CNT/CB/silicone rubber mixture.

The paste of CNT/CB/silicone rubber mixture was dispersed in a two-roll mill with adding a peroxide curing agent. Thereafter, compression molding was carried out in a molding mold with a load of 2,000 Kgf at a temperature of 170° C. for 5 minutes to produce a silicone rubber composite sheet.

Example 8 (2 wt % of Carbon Nanotube+10 wt % of Carbon Black)

2500 g of HCR silicone rubber which is solid silicone rubber, 50 g of carbon nanotubes having an L/D value of 1000 or more and 250 g of Denka Acetylene Black were put into a kneader apparatus and mixed and kneaded at a temperature of 50° C. for 10 minutes to prepare a paste of CNT/CB/silicone rubber mixture.

The paste of CNT/CB/silicone rubber mixture was dispersed in a two-roll mill with adding a peroxide curing agent. Thereafter, compression molding was carried out in a molding mold with a load of 2,000 Kgf at a temperature of 170° C. for 5 minutes to produce a silicone rubber composite sheet.

Example 9 (0.5 wt % of Carbon Nanotube+10 wt % of Carbon Black)

2500 g of HCR silicone rubber which is solid silicone rubber, 12.5 g of carbon nanotubes having an L/D value of 1000 or more and 250 g of Denka Acetylene Black were put into a kneader apparatus and mixed and kneaded at a temperature of 50° C. for 10 minutes to prepare a paste of CNT/CB/silicone rubber mixture.

The paste of CNT/CB/silicone rubber mixture was dispersed in a two-roll mill with adding a peroxide curing agent. Thereafter, compression molding was carried out in a molding mold with a load of 2,000 Kgf at a temperature of 170° C. for 5 minutes to produce a silicone rubber composite sheet.

Comparative Example 9 (1 wt % of Carbon Nanotube+15 wt % of Carbon Black)

2500 g of HCR silicone rubber which is solid silicone rubber, 25 g of carbon nanotubes having an L/D value of 1000 or more and 375 g of Denka Acetylene Black were put into a kneader apparatus and mixed and kneaded at a temperature of 50° C. for 10 minutes to prepare a paste of CNT/CB/silicone rubber mixture.

The paste of CNT/CB/silicone rubber mixture was dispersed in a two-roll mill with adding a peroxide curing agent. Thereafter, compression molding was carried out in a molding mold with a load of 2,000 Kgf at a temperature of 170° C. for 5 minutes to produce a silicone rubber composite sheet.

TABLE 3

| Sample | Surface resistivity ($\Omega$/sq.) | Volume resistivity ($\Omega \cdot$ cm) | Remark |
|---|---|---|---|
| Example 7 (CB 10 wt % + CNT 1 wt %) | 36 | 6.9 | |
| Example 8 (CB 10 wt % + CNT 2 wt %) | 14 | 2.8 | |
| Example 9 (CB 10 wt % + CNT 0.5 wt %) | $10^4$ | $10^3$ | |
| Comp. Example 1 (Ref.) | $>10^{13}$ | | Out of measurement range |
| Comp. Example 3 (CB 10 wt %) | $10^{(6\sim7)}$ | $10^{(5\sim6)}$ | |
| Comp. Example 9 (CB 15 wt % + CNT 1 wt %) | — | — | Unmixable |

As shown in Table 3, the composite of Example 7 in which the carbon nanotube and the carbon black are added together, had the surface resistivity and the volume resistivity much smaller than those of the composite containing only carbon black, indicating that the conductivity was remarkably improved.

<Experimental Example 2> Measurement of Variations of Surface Resistivity and Volume Resistivity of Composite The variations of the surface resistivity and the volume resistivity of the silicone rubber composites prepared in Example 7 and Comparative Example 2 were measured.

TABLE 4

| | Resistivity | #1 | #2 | #3 | #4 | #5 | #6 | #7 | #8 | #9 | #10 | Average | Varation |
|---|---|---|---|---|---|---|---|---|---|---|---|---|---|
| Example 7 | Surface | 33 | 34 | 37 | 41 | 35 | 40 | 33 | 38 | 34 | 33 | 36 | 2.86 |
| | Volume | 7.0 | 7.0 | 6.7 | 7.2 | 6.8 | 6.6 | 7.1 | 6.8 | 6.7 | 7.0 | 6.9 | 0.19 |
| Comp. Example 2 | Surface | 2E6 | 1E7 | 1E6 | 3E6 | 7E6 | 1E7 | 7E6 | 7E6 | 2E6 | 8E6 | 5.7E6 | 3.23E6 |
| | Volume | 4E5 | 2E6 | 2E5 | 7E5 | 1E6 | 2E5 | 1E6 | 2E6 | 5E5 | 2E6 | 1E6 | 7.1E5 |

*aEb = a×$10^b$

From the results in Table 4, it can be seen that the composite of Example 7 exhibits significantly small variations in surface resistivity and volume resistivity, which means that the conductivity by position of the composite is very uniform.

While specific embodiments of the invention have been described in detail, it will be appreciated by those skilled in the art that such detailed descriptions are merely preferred embodiments and the scope of the present invention is not limited thereto. Therefore, the true scope of the present invention should be defined by the appended claims and their equivalents.

What is claimed is:

1. A silicone rubber composite composition comprising solid silicone rubber and carbon nanotubes having an average length/diameter (L/D) value of 500 or more and 5000 or less, wherein the silicone rubber composite has a Shore A hardness of 60 or more as measured according to ASTM D2240.

2. The silicone rubber composite composition according to claim 1, wherein the carbon nanotubes are compressed or uncompressed and have a bulk density of 25 kg/m$^3$ or more before being blended with the solid silicone rubber.

3. The silicone rubber composite composition according to claim 1, wherein the composition comprises 0.2 to 10 parts by weight of carbon nanotubes relative to 100 parts by weight of the silicone rubber.

4. The silicone rubber composite composition according to claim 3, wherein the composition further comprises 5 to 15 parts by weight of carbon black relative to 100 parts by weight of the silicone rubber.

5. The silicone rubber composite composition according to claim 4, wherein the carbon nanotube and the carbon black are contained in a weight ratio of 1:5 to 1:20.

6. The silicone rubber composite according to claim 5, wherein the total content of the carbon nanotube and the carbon black is 10 parts by weight or more and 15 parts by weight or less relative to 100 parts by weight of the solid silicone rubber.

7. The silicone rubber composite composition according to claim 1, wherein the solid silicone rubber is in a solid or semi-solid state having no fluidity.

8. A silicone rubber composite comprising a reaction product of the silicone rubber composite composition according to claim 1.

9. The silicone rubber composite according to claim 8, wherein the silicone rubber composite has a specific gravity of 1.18 or less.

10. The silicone rubber composite according to claim 8, wherein the silicone rubber composite has a surface resistivity of $10_A7$ Ω/sq. or less.

11. The silicone rubber composite according to claim 8, wherein the silicone rubber composite has a volume resistivity of 20 Ω·cm or less.

12. A silicone rubber composite composition comprising solid silicone rubber and carbon nanotubes having an average length/diameter (L/D) value of 500 or more and 5000 or less, wherein an elongation of the silicone rubber composite has an elongation of 300% or more as measured according to ASTM D412.

13. A method for producing a silicone rubber composite, comprising the steps of:
   adding carbon nanotubes or a mixture of carbon nanotubes and carbon black to solid silicone rubber to prepare a mixture;
   kneading the mixture to prepare a kneaded mixture;
   blending a curing agent into the kneaded mixture to prepare a blended mixture; and
   curing and compression molding the blended mixture to form the silicone rubber composite,
   wherein the carbon nanotubes have an average length/diameter (L/D) value of 500 or more and 5000 or less.

14. The method according to claim 13, wherein the curing agent comprises an organic peroxide selected from the group consisting of alkyl-based organic peroxides and acyl-based organic peroxides.

* * * * *